(12) United States Patent
Guo et al.

(10) Patent No.: US 11,200,912 B1
(45) Date of Patent: Dec. 14, 2021

(54) DATA STORAGE DEVICE WITH SERVO FIELD DEPENDENT WRITE BOOST

(71) Applicant: Western Digital Technologies, Inc., San Jose, CA (US)

(72) Inventors: Guoxiao Guo, Irvine, CA (US); Charles A. Park, Aromas, CA (US); David Scott C. Amiss, San Francisco, CA (US); Duc H. Banh, San Jose, CA (US); Joey M. Poss, Rochester, MN (US); Weldon M. Hanson, Rochester, MN (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 0 days.

(21) Appl. No.: 17/182,365

(22) Filed: Feb. 23, 2021

Related U.S. Application Data

(60) Provisional application No. 63/143,113, filed on Jan. 29, 2021.

(51) Int. Cl.
*G11B 5/09* (2006.01)
*G11B 20/12* (2006.01)

(52) U.S. Cl.
CPC ............ *G11B 5/09* (2013.01); *G11B 20/1217* (2013.01); *G11B 2020/1232* (2013.01)

(58) Field of Classification Search
CPC ......... G11B 27/36; G11B 20/16; G11B 20/12; G11B 20/18; G11B 2020/183; G11B 19/04; G11B 5/00; G11B 5/09
USPC .............................................. 360/48, 53, 75
See application file for complete search history.

(56) References Cited

U.S. PATENT DOCUMENTS

| | | |
|---|---|---|
| 8,929,013 B1 | 1/2015 | Mastrocola et al. |
| 9,111,561 B1 | 8/2015 | Contreras et al. |
| 2007/0211368 A1* | 9/2007 | Shibano ............ G11B 5/59688 360/75 |

* cited by examiner

*Primary Examiner* — Nabil Z Hindi
(74) *Attorney, Agent, or Firm* — Patterson & Sheridan, LLP; Steven H. Versteeg

(57) ABSTRACT

A data storage device is disclosed comprising a head actuated over a magnetic media. A write boost is configured to a first setting, and a first pattern of magnetic transitions is written to a first servo field of a servo sector on the magnetic media using the first setting for the write boost. The write boost is configured to a second setting different from the first setting, and the first pattern of magnetic transitions is written to a second servo field of the servo sector on the magnetic media using the second setting for the write boost.

20 Claims, 4 Drawing Sheets

US 11,200,912 B1

DATA STORAGE DEVICE WITH SERVO FIELD DEPENDENT WRITE BOOST

CROSS REFERENCE TO RELATED APPLICATIONS

This application claims priority to U.S. Provisional Patent Application Ser. No. 63/143,113, filed on Jan. 29, 2021, which is hereby incorporated by reference in its entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to the disk by modulating a write current in an inductive coil (write coil) to record magnetic transitions onto the disk surface in a process referred to as saturation recording. During read-back, the magnetic transitions are sensed by a read element (e.g., a magneto-resistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface.

DETAILED DESCRIPTION

Figure 2A:
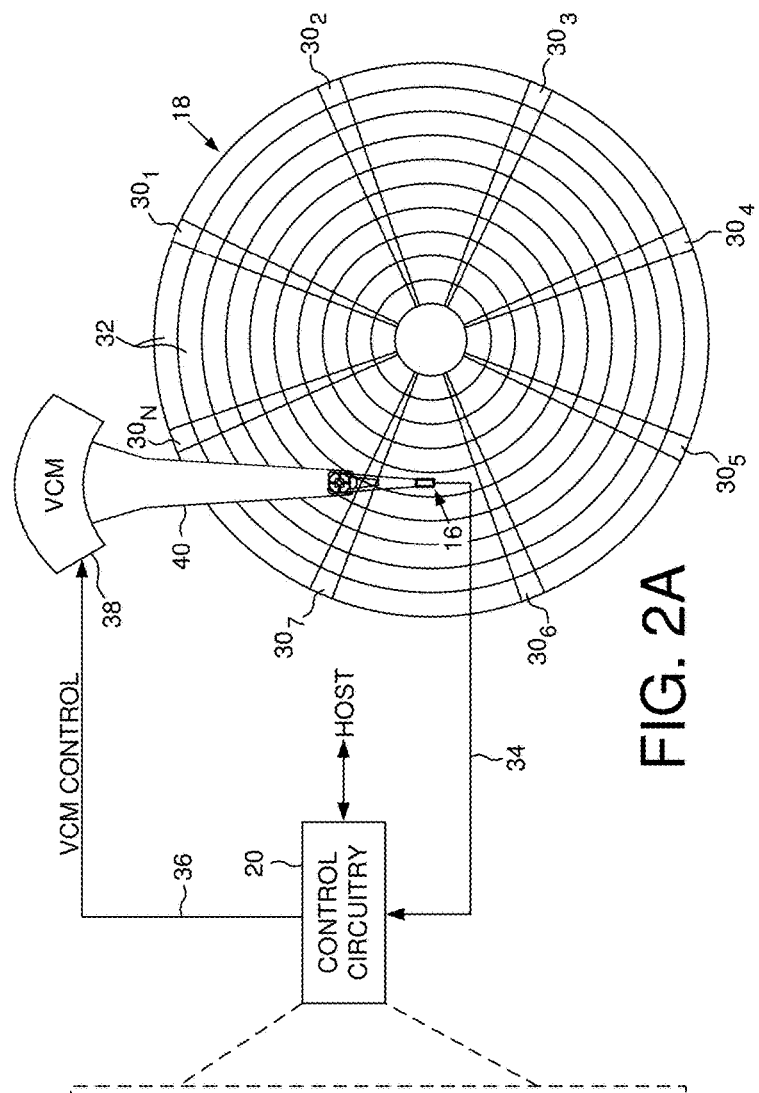
FIG. 2A shows a data storage device in the form of a disk drive according to an embodiment comprising a head actuated over a disk.
Figure 2B:
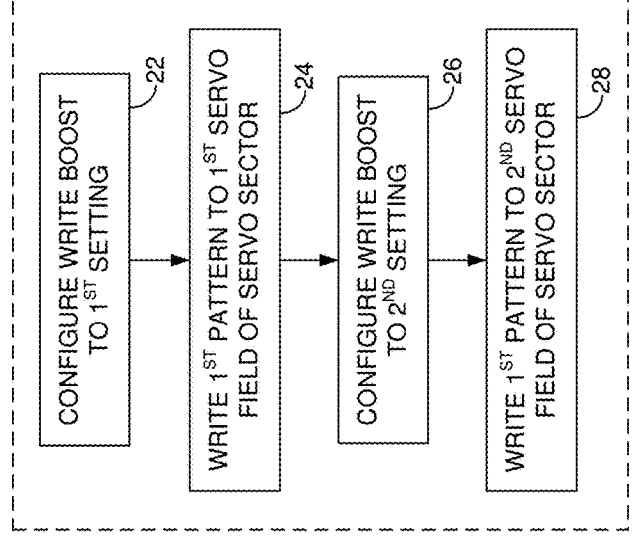
FIG. 2B is a flow diagram according to an embodiment wherein a field dependent write boost is configured when writing a servo sector on the disk.

FIG. 2A shows a data storage device in the form of a disk drive according to an embodiment comprising a head 16 actuated over a magnetic media such as a disk 18. While a disk drive is used as an illustrative example herein, various embodiments of the invention may be applied to, and/or include, other types of data storage device with magnetic media such as tape drives. The disk drive further comprises control circuitry 20 configured to execute the flow diagram of FIG. 2B, wherein a write boost is configured to a first setting (block 22), and a first pattern of magnetic transitions is written to a first servo field of a servo sector on the magnetic media using the first setting for the write boost (block 24). The write boost is configured to a second setting different from the first setting (block 26), and the first pattern of magnetic transitions is written to a second servo field of the servo sector on the magnetic media using the second setting for the write boost (block 28).

Figure 1:
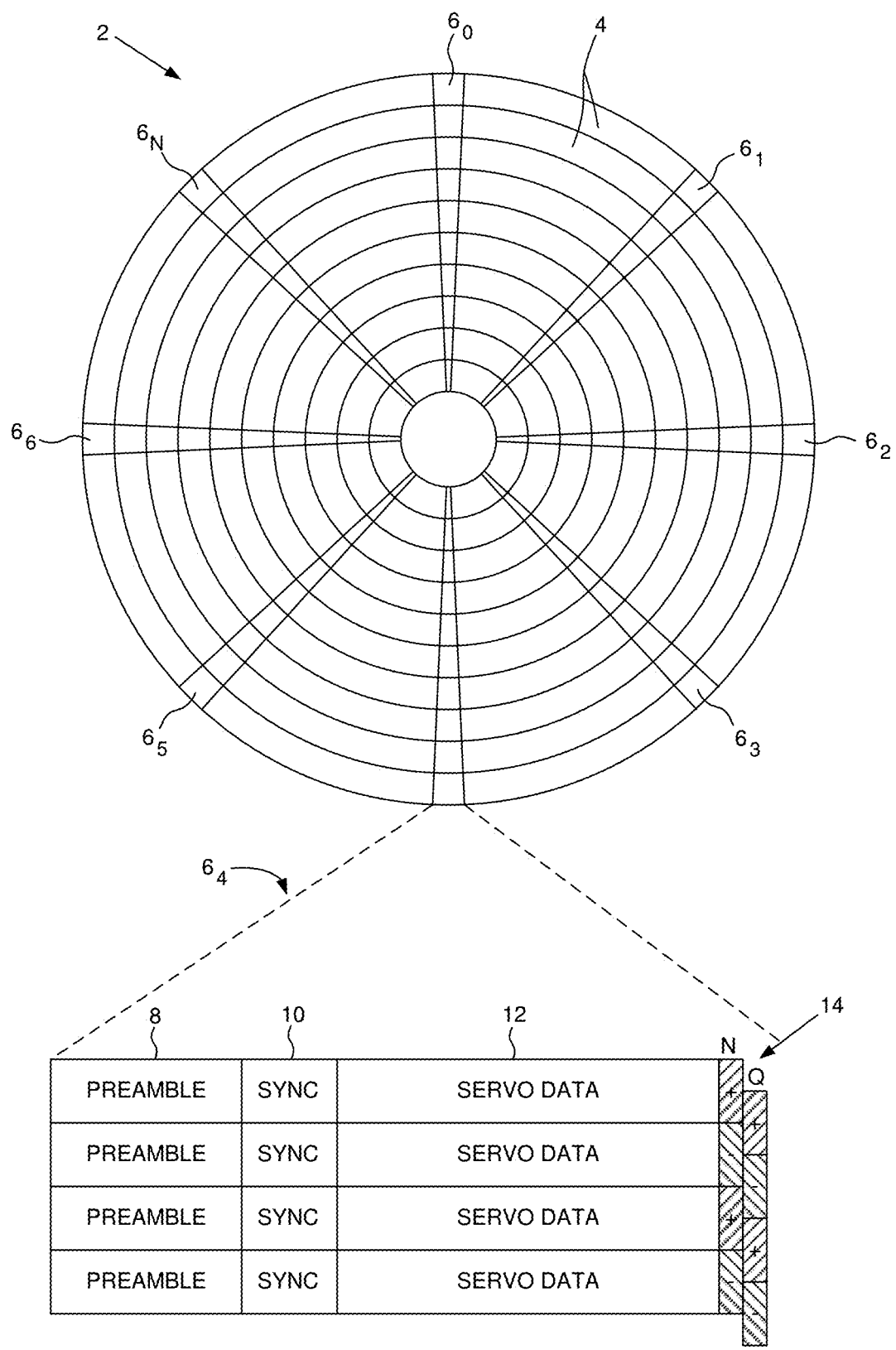
FIG. 1 shows a prior art disk format comprising a plurality of servo tracks defined by servo sectors.

In the embodiment of FIG. 2A, the disk 18 comprises a plurality of servo sectors $30_1$-$30_N$ that define a plurality of servo tracks 32, wherein data tracks are defined relative to the servo tracks at the same or different radial density. The control circuitry 20 processes a read signal 34 emanating from the head to demodulate the servo sectors and generate a position error signal (PES) representing an error between the actual position of the head and a target position relative to a target track. A servo control system in the control circuitry 20 filters the PES using a suitable compensation filter to generate a control signal 36 applied to a coarse actuator 38 (e.g., VCM) which rotates an actuator arm 40 about a pivot in order to actuate the head radially over the disk in a direction that reduces the PES. The head may also be served using a fine actuator, such as a piezoelectric (PZT) actuator, configured to actuate a suspension relative to the actuator arm 40, and/or configured to actuate the head relative to the suspension. The servo sectors $30_1$-$30_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3:
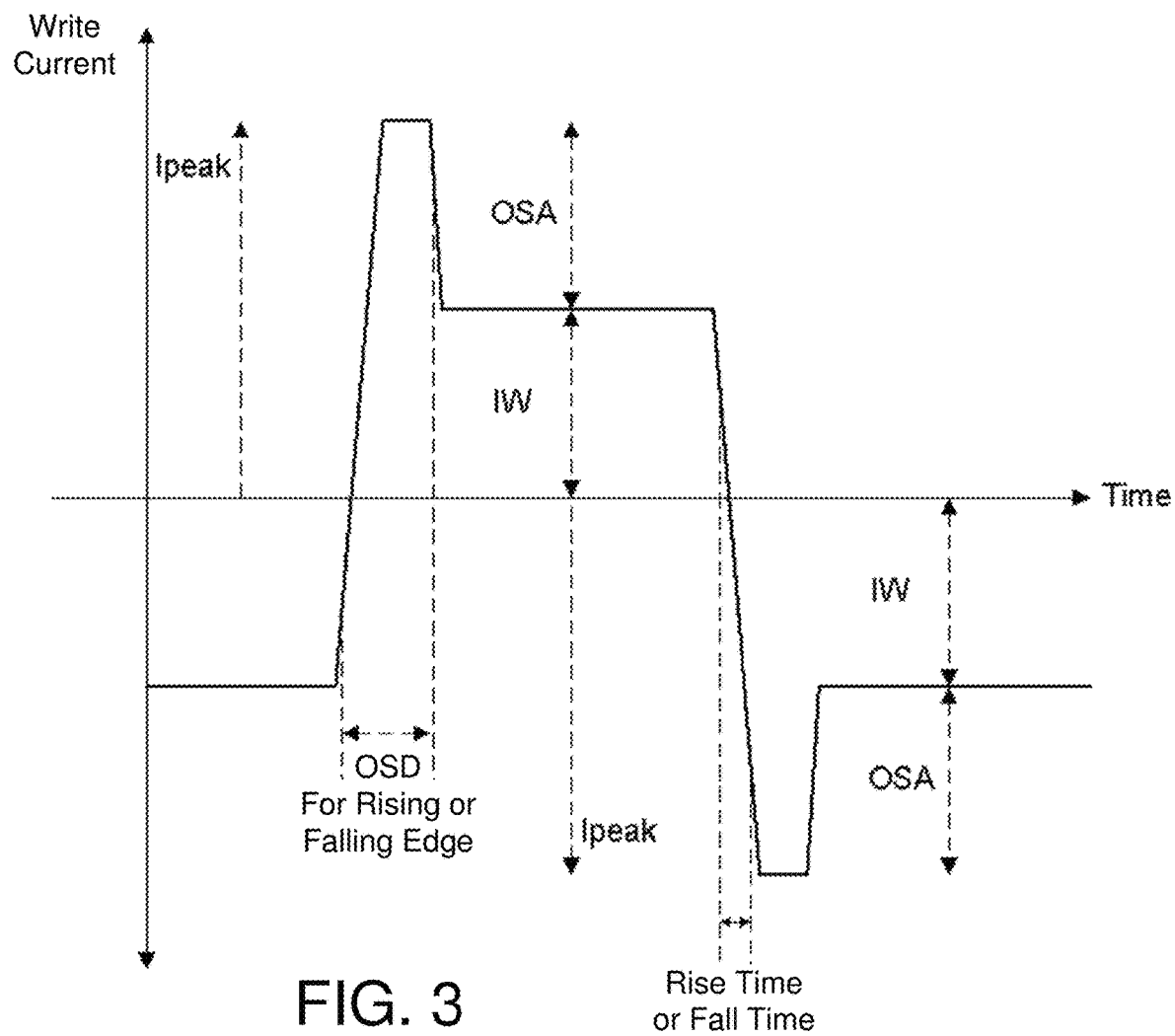
FIG. 3 shows an embodiment wherein the write boost comprises at least one of an amplitude of a write current, an overshoot amplitude of the write current, or an overshoot duration of the write current.

The fidelity of the magnetic transitions written onto the magnetic media, including the degradation of adjacent data tracks due to adjacent track interference (ATI) when writing to a target data track, may depend on a number of write parameters configured for the head. FIG. 3 shows an embodiment wherein the write parameters may include parameters of a write current (Iw) applied to a write coil of the head, including an amplitude of the write current, an overshoot amplitude (OSA) of the write current, and an overshoot duration (OSD) of the write current. In one embodiment, a write parameter may be boosted (i.e., write boost) depending on the pattern of magnetic transitions being written to the magnetic media. For example when writing a high frequency pattern of magnetic transitions, the write current OSA may be boosted in order to fully saturate the magnetic media, whereas when writing a lower frequency pattern of magnetic transitions, the write current OSA may be un-boosted while boosting the write current amplitude and/or OSD in order to reduce ATI.

Figure 2C:
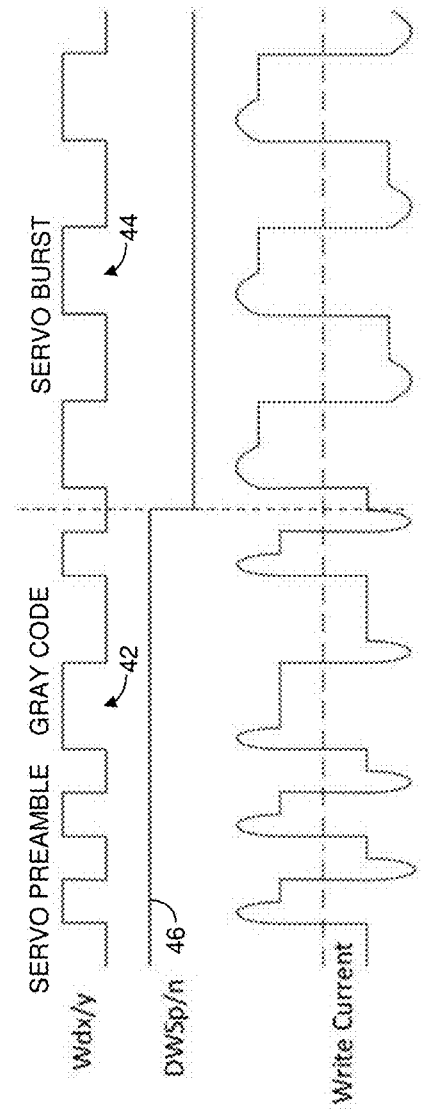
FIG. 2C shows an embodiment wherein the write boost is configured to a first setting when writing a servo preamble and Gray code field, and configured to a second setting when writing a servo burst field.

FIG. 2C shows an embodiment wherein when writing a servo sector to the disk a servo preamble field is written by writing a high frequency pattern of magnetic transitions, whereas a servo burst field is written with a lower frequency pattern of magnetic transitions. A Gray code field representing a track address is written between the servo preamble and servo bursts, wherein the Gray code may be written with both high frequency magnetic transitions and low frequency magnetic transitions. As shown in FIG. 2C, when writing the high frequency servo preamble field the amplitude of the write current is not boosted but the OSA is boosted, and when writing the lower frequency servo burst field, the amplitude of the write current is boosted, the OSA is not boosted, and the OSD is boosted. When writing high frequency magnetic transitions of the Gray code field, the amplitude of the write current is not boosted and the OSA is boosted similar to when writing the servo preamble field. However when writing low frequency magnetic transitions of the Gray code field, the write current is configured the same as when writing the high frequency magnetic transitions of the servo preamble (i.e., the amplitude of the write current is not boosted and the OSA is boosted) in order to simplify the servo writing procedure. For example, the pattern of magnetic transitions 42 in the Gray code field of FIG. 2C matches the pattern of magnetic transitions 44 when writing a servo burst. However instead of configuring the write current similar to when writing a servo burst (with boosted write current amplitude and boosted OSD), the write current is configured the same as when writing the high frequency patterns of the servo preamble (e.g., with un-boosted write current amplitude and boosted OSA).

Figure 4:
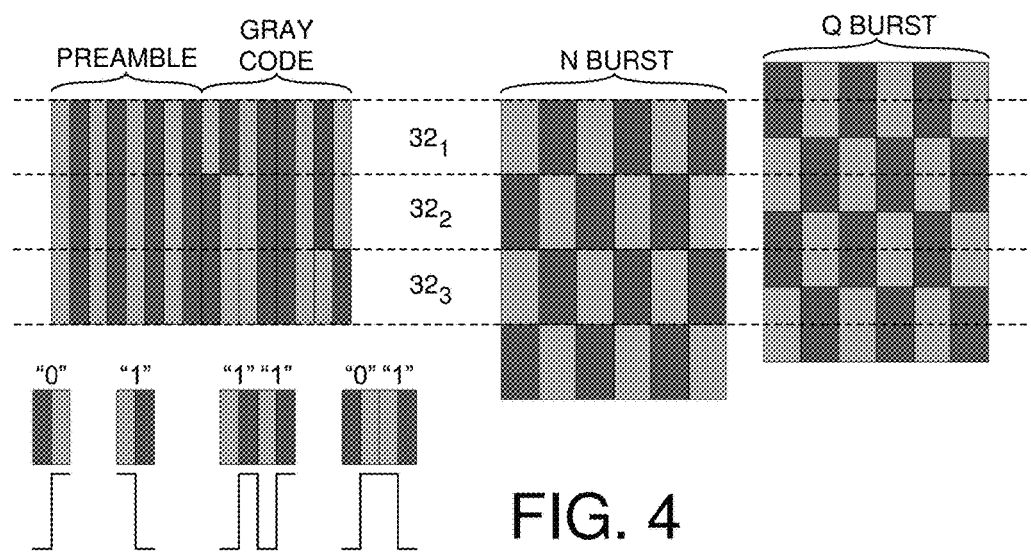
FIG. 4 shows an example of a servo sector written to the disk using biphase modulation.

The servo sectors may be written using any suitable modulation technique. In the embodiment of FIG. 4, a servo sector is written using biphase modulation wherein a "0" bit is written with a magnetic transition having a first polarity change and a "1" bit is written with a magnetic transition having a second polarity change opposite the first polarity change. When writing consecutive "1" bits or consecutive "0" bits the result is a pattern of high frequency magnetic transitions, and when writing a "01" bit sequence or a "10" bit sequence the result is a pattern of lower frequency magnetic transitions as shown in FIG. 4. In one embodiment, the servo sectors may be "self written" by the control circuitry 20 internal to the data storage device, for example, during a manufacturing procedure. In another embodiment, an external servo writer may be used to servo write the servo sectors onto a disk, and then the servo written disk may be installed into a production disk drive. Accordingly in one embodiment, an external servo writer may be considered a data storage device configured to write the servo sectors to the disk by configuring the write boost depending on the servo field being written as described above.

Figure 5:
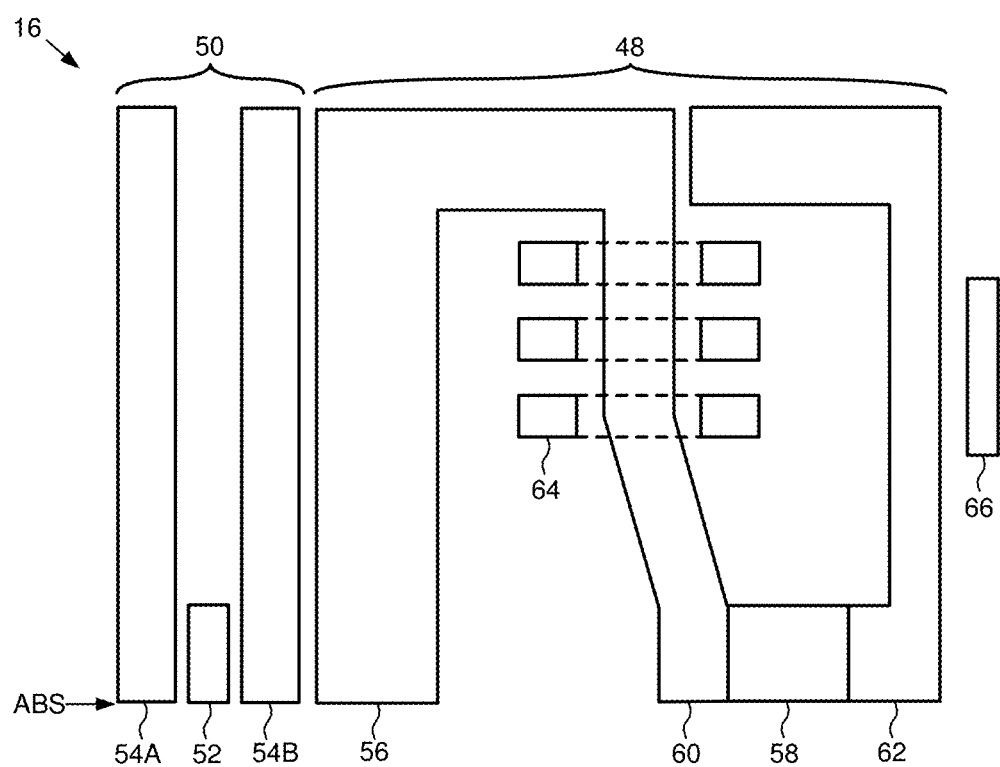
FIG. 5 shows a cross-section of a head comprising a write assist element (e.g., a laser for HAMR or a STO for MAMR) according to an embodiment.

FIG. 5 shows a cross-sectional view of a suitable head 16 according to an embodiment, wherein the head 16 may comprise more or fewer elements in various other embodiments. In the embodiment of FIG. 5, the head 16 comprises write elements 48 configured to write data to the disk surface, and read elements 50 configured to read data from the disk surface. The bottom surface of the head 16 facing the disk surface is referred to as an air bearing surface (ABS) wherein an air bearing forms between the head 16 and the disk surface due to the disk spinning such that the head 16 effectively flies above the disk surface. The read elements 50 of the head 16 may comprise a magnetoresistive (MR) read element 52 that is fabricated between MR shields 54A and 54B. Other embodiments may employ a different read element, such as a suitable magnetic tunneling junction (MTJ) read element. The write elements 48 comprise a return pole 56, a write assist element 58 (e.g., a suitable laser and NFT in HAMR, a STO in MAMR, or a material stack, including conductive materials, used in energy assisted recording) fabricated between a main pole 60 and a trailing shield 62, and a write coil 64 that excites the main pole 60 to generate a magnetic write field that magnetizes the disk surface, thereby writing data to the disk surface. The head 16 may also comprise a fly height actuator (FHA) 66 that is biased to achieve a target fly height of the head 16 over the disk surface. Any suitable FHA 66 may be employed, such as a suitable thermal actuator that adjusts the fly height through thermal expansion, or a suitable mechanical actuator such as a suitable piezoelectric actuator that adjusts the fly height through mechanical deflection.

In one embodiment, the write boost that is configured when writing a servo sector to the disk may comprise a parameter of a write assist bias applied to the write assist element 58 shown in FIG. 5, such as parameter(s) of a bias signal applied to a laser, STO, or other suitable material stack for energy assisted recording. In one embodiment, the parameters configured for the write assist element 58 may be similar to the parameters configured to the write current such as shown in FIG. 3 (e.g., bias amplitude, OSA, OSD, etc.). In one embodiment, a write boost may be configured for both the write current and the write assist element 58 depending on the servo field being servo written in order to optimize the fidelity of the recorded magnetic transitions as described above.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a magnetic media;
    a head actuated over the magnetic media; and
    control circuitry configured to:
        configure a write boost to a first setting;
        write a first pattern of magnetic transitions to a first servo field of a servo sector on the magnetic media using the first setting for the write boost;
        configure the write boost to a second setting different from the first setting; and
        write the first pattern of magnetic transitions to a second servo field of the servo sector on the magnetic media using the second setting for the write boost.

2. The data storage device as recited in claim 1, wherein the write boost comprises at least one of an amplitude of a write current, an overshoot amplitude of the write current, or an overshoot duration of the write current.

3. The data storage device as recited in claim 1, wherein the write boost comprises at least one of an amplitude of a laser current, an overshoot amplitude of the laser current, or an overshoot duration of the laser current.

4. The data storage device as recited in claim 1, wherein the write boost comprises at least one of an amplitude of a write assist bias, an overshoot amplitude of the write assist bias, or an overshoot duration of the write assist bias.

5. The data storage device as recited in claim 1, wherein the first servo field of the servo sector comprises a preamble field and the second servo field comprises a servo burst field.

6. The data storage device as recited in claim 1, wherein the first servo field of the servo sector comprises a Gray code field and the second servo field comprises a servo burst field.

7. The data storage device as recited in claim 1, wherein:
    the write boost comprises an amplitude of a write current; and
    the first servo field of the servo sector comprises a preamble field and the second servo field comprises a servo burst field,
    wherein the control circuitry is further configured to:
        configure the amplitude of the write current to a first value when writing the first pattern to the first servo field of the servo sector; and
        configure the amplitude of the write current to a second value when writing the first pattern to the second servo field of the servo sector, wherein the second value is higher than the first value.

8. The data storage device as recited in claim 1, wherein:
    the write boost comprises an overshoot amplitude of a write current; and
    the first servo field of the servo sector comprises a preamble field and the second servo field comprises a servo burst field,
    wherein the control circuitry is further configured to:
        configure the overshoot amplitude of the write current to a first value when writing the first pattern to the first servo field of the servo sector; and
        configure the overshoot amplitude of the write current to a second value when writing the first pattern to the second servo field of the servo sector, wherein the second value is lower than the first value.

9. The data storage device as recited in claim 1, wherein:
    the write boost comprises an overshoot duration of a write current; and
    the first servo field of the servo sector comprises a preamble field and the second servo field comprises a servo burst field,
    wherein the control circuitry is further configured to:
        configure the overshoot duration of the write current to a first value when writing the first pattern to the first servo field of the servo sector; and
        configure the overshoot duration of the write current to a second value when writing the first pattern to the second servo field of the servo sector, wherein the second value is longer than the first value.

10. A data storage device comprising:
a magnetic media;
a head actuated over the magnetic media; and
control circuitry configured to:
configure a write boost to a first setting;
first write a first pattern of magnetic transitions to a servo sector on the magnetic media using the first setting for the write boost;
configure the write boost to a second setting different from the first setting; and
second write the first pattern of magnetic transitions to the servo sector on the magnetic media using the second setting for the write boost.

11. The data storage device as recited in claim 10, wherein the write boost comprises at least one of an amplitude of a write current, an overshoot amplitude of the write current, or an overshoot duration of the write current.

12. The data storage device as recited in claim 10, wherein the write boost comprises at least one of an amplitude of a laser current, an overshoot amplitude of the laser current, or an overshoot duration of the laser current.

13. The data storage device as recited in claim 10, wherein the write boost comprises at least one of an amplitude of a write assist bias, an overshoot amplitude of the write assist bias, or an overshoot duration of the write assist bias.

14. The data storage device as recited in claim 10, wherein the first write is to a preamble field of the servo sector and the second write is to a servo burst field of the servo sector.

15. The data storage device as recited in claim 10, wherein the first write is to a Gray code field of the servo sector and the second write is to a servo burst field of the servo sector.

16. The data storage device as recited in claim 10, wherein:
the write boost comprises an amplitude of a write current; and
the first write is to a preamble field of the servo sector and the second write is to a servo burst field of the servo sector,
wherein the control circuitry is further configured to:
configure the amplitude of the write current to a first value for the first write; and
configure the amplitude of the write current to a second value for the second write, wherein the second value is higher than the first value.

17. The data storage device as recited in claim 10, wherein:
the write boost comprises an overshoot amplitude of a write current; and
the first write is to a preamble field of the servo sector and the second write is to a servo burst field of the servo sector,
wherein the control circuitry is further configured to:
configure the overshoot amplitude of the write current to a first value for the first write; and
configure the overshoot amplitude of the write current to a second value for the second write, wherein the second value is lower than the first value.

18. The data storage device as recited in claim 10, wherein:
the write boost comprises an overshoot duration of a write current; and
the first write is to a preamble field of the servo sector and the second write is to a servo burst field of the servo sector,
wherein the control circuitry is further configured to:
configure the overshoot duration of the write current to a first value for the first write; and
configure the overshoot duration of the write current to a second value for the second write, wherein the second value is longer than the first value.

19. A data storage device comprising:
a magnetic media;
a head actuated over the magnetic media; and
a means for configuring a write boost to a first setting;
a means for writing a first pattern of magnetic transitions to a servo sector on the magnetic media using the first setting for the write boost;
a means for configuring the write boost to a second setting different from the first setting; and
a means for writing the first pattern of magnetic transitions to the servo sector on the magnetic media using the second setting for the write boost.

20. The data storage device as recited in claim 19, wherein the write boost comprises at least one of an amplitude of a write current, an overshoot amplitude of the write current, or an overshoot duration of the write current.

* * * * *